US011361316B2

(12) United States Patent
Collin (10) Patent No.: US 11,361,316 B2
(45) Date of Patent: Jun. 14, 2022

(54) SYSTEMS AND METHODS FOR PROVIDING A PERSONAL DISTRIBUTED LEDGER

(71) Applicant: REFINITIV US ORGANIZATION LLC, New York, NY (US)

(72) Inventor: Richard Collin, East Sussex (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 985 days.

(21) Appl. No.: 15/612,288

(22) Filed: Jun. 2, 2017

(65) Prior Publication Data

US 2017/0352031 A1 Dec. 7, 2017

Related U.S. Application Data

(60) Provisional application No. 62/346,097, filed on Jun. 6, 2016.

(51) Int. Cl.
*G06Q 20/38* (2012.01)
*G06Q 30/06* (2012.01)
(Continued)

(52) U.S. Cl.
CPC ......... *G06Q 20/389* (2013.01); *G06Q 20/363* (2013.01); *G06Q 20/38* (2013.01);
(Continued)

(58) Field of Classification Search
CPC . H04L 9/3239; H04L 9/3247; G06Q 30/0601; G06Q 30/06; G06Q 20/38; G06Q 20/363; G06Q 20/389; G06Q 20/4016
See application file for complete search history.

(56) References Cited

U.S. PATENT DOCUMENTS 10,282,711 B2 * 5/2019 Chan ...................... G06Q 50/08
11,010,729 B2 * 5/2021 Musiala, Jr. ....... G06Q 20/0655
(Continued)

FOREIGN PATENT DOCUMENTS

WO 2017145049 8/2017

OTHER PUBLICATIONS

Andreas Antonopoulos, "Mastering Bitcoin" Oct. 7, 2014, O'Reilly Media, Inc.*
(Continued)

*Primary Examiner* — Steven S Kim
(74) *Attorney, Agent, or Firm* — Norton Rose Fulbright US LLP (57) ABSTRACT

An embodiment of a method of recording transactions conducted in a public distributed ledger system using a personal distributed ledger system includes: generating, by a wallet distributed application, an address in the public distributed ledger system and a private key; signing, by the wallet distributed application, a transaction to a distributed application in the public distributed ledger system using the generated address and private key; generating, by the wallet distributed application, a transaction to the personal distributed ledger system, the generated transaction containing information identifying the signed transaction to the public distributed ledger system, such as the private key used to sign the transaction; and transmitting, by the wallet distributed application, the transaction to at least one distributed node of the personal distributed ledger system.

11 Claims, 7 Drawing Sheets

(51) Int. Cl.
  *H04L 9/32* (2006.01)
  *G06Q 20/36* (2012.01)
(52) U.S. Cl.
  CPC ......... *G06Q 30/06* (2013.01); *G06Q 30/0601* (2013.01); *H04L 9/3239* (2013.01); *H04L 9/3247* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 11,126,975 B2* | 9/2021 | Haldenby | G06Q 10/063114 |
| 2015/0262137 A1* | 9/2015 | Armstrong | G06Q 20/0658 705/41 |
| 2015/0371224 A1 | 12/2015 | Lingappa | |
| 2016/0342977 A1* | 11/2016 | Lam | G06Q 20/0658 |
| 2016/0342994 A1* | 11/2016 | Davis | G06Q 20/4014 |
| 2017/0005804 A1* | 1/2017 | Zinder | G06F 16/219 |
| 2017/0111175 A1 | 4/2017 | Oberhauser et al. | |
| 2017/0177855 A1 | 6/2017 | Costa Faidella et al. | |
| 2017/0193619 A1* | 7/2017 | Rollins | G06Q 50/184 |
| 2017/0289111 A1 | 10/2017 | Voell et al. | |
| 2017/0316391 A1* | 11/2017 | Peikert | G06Q 20/0658 |
| 2017/0372300 A1* | 12/2017 | Dunlevy | G06Q 20/36 |
| 2018/0062848 A1* | 3/2018 | Gorman | H04L 9/3247 |
| 2018/0096175 A1* | 4/2018 | Schmeling | B29C 64/10 |
| 2018/0268401 A1* | 9/2018 | Ortiz | G06Q 20/204 |
| 2018/0322587 A1* | 11/2018 | Linne | H04L 9/3236 |
| 2019/0013948 A1* | 1/2019 | Mercuri | G06F 9/542 |

OTHER PUBLICATIONS

Peters et al., "Understanding Modern Banking Ledgers through Blockchain Technologies: Future of Transaction Processing and Smart Contracts on the Internet of Money" Nov. 19, 2015.*
Franco, "Understanding Bitcoin: Cryptography, Engineering and Economics", XP055393688, Wiley Finance Series, Nov. 24, 2014, 142 pages.
International Search Report and Written Opinion dated Sep. 12, 2017, of the corresponding International Application PCT/IB2017/053291 filed Jun. 2, 2017, 8 pages.
Examination report No. 4 for standard patent application, dated Aug. 11, 2020, for Australian Patent Application 2017279012.
Swan M. "Blockchain: Blueprint for a new economy" O'Reilly Media, Inc., Jan. 24, 2015, 149 Pages.
Swanson T. 'Consensus-as-a-service: a brief report on the emergence of permissioned, distributed ledger systems' Published: Apr. 6, 2015. Retrieved from the Internet on Aug. 28, 2020: https://www.the-blockchain.com/wp-content/uploads/2016/04/Permissioned-distributed-ledgers.pdf, 66 Pages.

* cited by examiner

SYSTEMS AND METHODS FOR PROVIDING A PERSONAL DISTRIBUTED LEDGER

CROSS REFERENCE TO RELATED APPLICATIONS

This application claims priority to U.S. Provisional Patent Application No. 62/346,097, filed on Jun. 6, 2016, which is hereby incorporated by reference in its entirety.

BACKGROUND INFORMATION

Distributed ledger systems are increasingly used to implement currency, financial transactions and other functions. Often, it is desirable for a user to conduct transactions with such systems anonymously, in order to conceal their financial positions, etc. One way for users to conduct transactions anonymously within a distributed ledger system is to generate and use a different public address and private key for each transaction. As users typically store private keys used to sign transactions in a secure location outside the distributed ledger system, it is usually not possible to connect the identity of the user to the transaction through the private key.

In tension with this, know-your-customer regulatory mandates typically require banks, financial institutions and other entities to verify the identity of their customers. Know-your-customer mandates help prevent criminals from using transactions conducted through these institutions to perform money laundering and other crimes. However, a user conducting transactions anonymously through the use of newly generated addresses and keys for every transaction stifles satisfaction of know-your-customer mandates.

Thus, a need exists for systems and methods to securely but reliably link transactions conducted anonymously in a distributed ledger system and the user conducting the transactions.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

Embodiments of a system for providing a personal distributed ledger record of details of transactions conducted in a public distributed ledger system in a personal distributed ledger system, enabling an immutable, secure and reliable link between the transactions conducted in the public ledger and the user conducting the transactions.

To conduct transactions in the public distributed ledger system, a wallet distributed application may be invoked by a distributed application of the public distributed ledger system. The wallet application may generate an address in the public distributed ledger system and a private key, sign the transaction using the generated address and key, and transmit the signed transaction to a distributed node of the public distributed ledger system. To record details of the transaction in a personal distributed ledger, the wallet application also may generate a transaction invoking a smart contract in the personal distributed ledger system and containing details of the transaction conducted in the public distributed ledger system, such as the private key used to sign the transaction and an identifier identifying the transaction, and transmit the generated transaction to a distributed node of the personal distributed ledger system. Upon execution, the transaction may invoke a storage function of the contract, which may store the contained transaction information in a data structure of the personal distributed ledger system associated with the contract.

To satisfy know-your-customer mandates, a validator system, such as operated by a financial institution, may be allowed selective access to the personal distributed ledger system to confirm to the operator of the validator system details of the record of transactions conducted in the public distributed ledger system stored in the personal distributed ledger system. The financial institution may utilize this information to determine whether to authorize the user to use the financial institution's systems to conduct further transactions in the public distributed ledger system.

The personal distributed ledger system also may be used to store personal data of the user, such as digital assets, identity data, and custom data, or encodings of such, and subsequently distribute such data to authorized entities.

Figure 1:
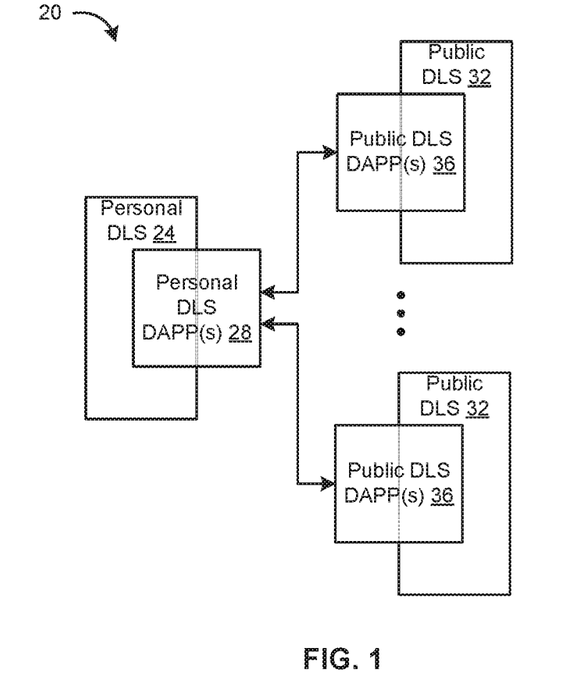
FIG. 1 is a schematic diagram depicting an embodiment of a system for providing a personal distributed ledger.

FIG. 1 depicts an embodiment of a system 20 for providing a personal distributed ledger for recording transactions conducted in a public distributed ledger to create an immutable, secure and reliable link between the transactions conducted in the public ledger and the user conducting the transactions. The system 20 includes a personal distributed ledger system (DLS) 24, one or more distributed applications (DAPPs) 28 based in the personal DLS 24, one or more public DLSs 32, and one or more DAPPs 36 based in the public DLSs 32. The personal DLS 24 and personal DLS DAPPs 28 provide a distributed ledger and corresponding interfaces separate from the public DLSs 32, with access restricted to only the user associated with the personal DLS 24 and entities authorized by the user, to provide the transaction recording and other personal data functions discussed herein. The public DLSs 32 and public DLS DAPPs 36 provide distributed ledgers and corresponding interfaces open to use by the public at large, or at least more than the user, to provide the various functions that DLSs may provide, such as monetary systems, financial transactions, etc.

Figure 2:
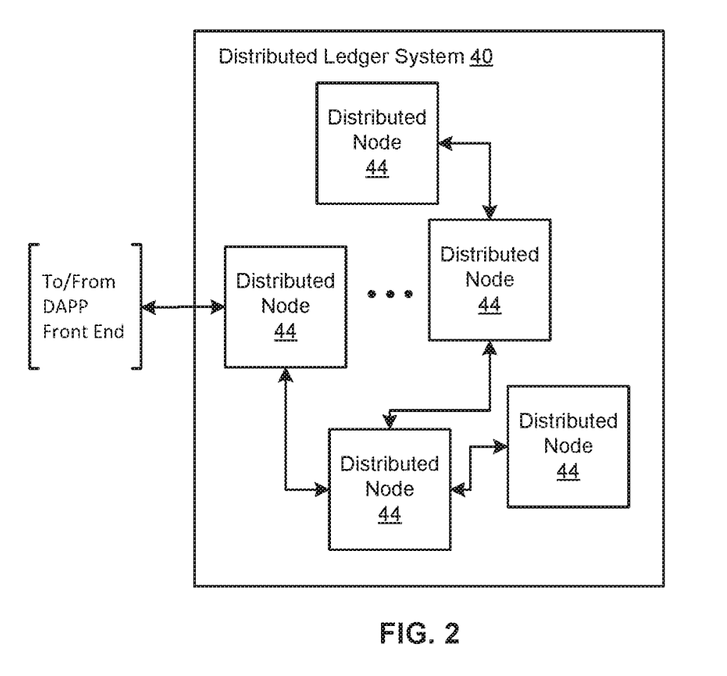
FIG. 2 is a schematic diagram depicting an embodiment of a distributed ledger system.

FIG. 2 depicts an exemplary embodiment of a DLS 40 that may be used to individually implement each of the personal DLS 24 and public DLSs 32. The DLS 40 includes a plurality of distributed nodes 44. The distributed nodes 44 are organized as a peer-to-peer network, in which each of the nodes 44 may connect to one or more of the other nodes 44 using a peer-to-peer communication protocol. At least one of the distributed nodes 44 also connects to a front end of a DAPP based in the DLS 40, such as a wallet DAPP front end in the case of the personal DLS 24 or a public DLS DAPP front end in the case of the public DLS 32. As a peer-to-peer network, the configuration of connections between individual distributed nodes 44 may change over time according to operation of the peer-to-peer protocol.

Figure 3:
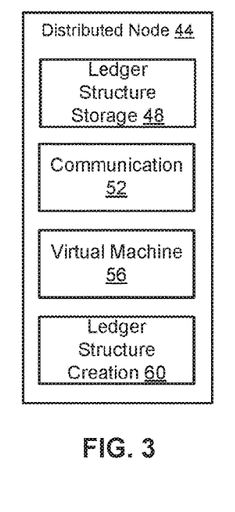
FIG. 3 is a schematic diagram depicting an embodiment of a distributed node of a distributed ledger system.

FIG. 3 depicts an exemplary embodiment of the distributed node 44 of the DLS, including a ledger structure storage module 48, a communication module 52, a virtual machine module 56 and a ledger structure creation module 60. The ledger structure storage module 48 stores data structures into which the ledger of the DLS 40 is organized. The communication module 52 performs communications between the distributed node 44 and other distributed nodes 44 and other systems or components connected to the distributed node 44, such as DAPP front ends. The virtual machine module 56 executes contracts stored on the distributed ledger of the DLS 40. The ledger structure creation module 60 performs an algorithm to incorporate new transactions and other data into ledger structures of the DLS 40, such as a data encryption algorithm of a selected complexity.

In embodiments, the distributed node 44 may include only any subset of, or an alternative connection of, the features depicted in or discussed herein in regard to FIG. 3.

In embodiments, the DLS 40 may be a blockchain system in which the ledger implemented by the DLS 40 is in the form of a sequence of structured data blocks, also referred to as a blockchain. In such embodiments, the ledger structure storage module 48 is a block storage module that stores the blocks of the blockchain system, and the ledger structure creation module 60 is a block creation module performing an algorithm to incorporate new transactions and other data into blocks of the blockchain of the blockchain system, also referred to as mining blocks of the blockchain system. In other embodiments, the DLS 40 may be another type of DLS 40 instead of a blockchain system, in which the ledger may be organized into a structure other than blocks of a blockchain.

In embodiments, the personal DLS 24 and public DLS 32 may be implemented using the same or different types of DLSs.

Figure 4:
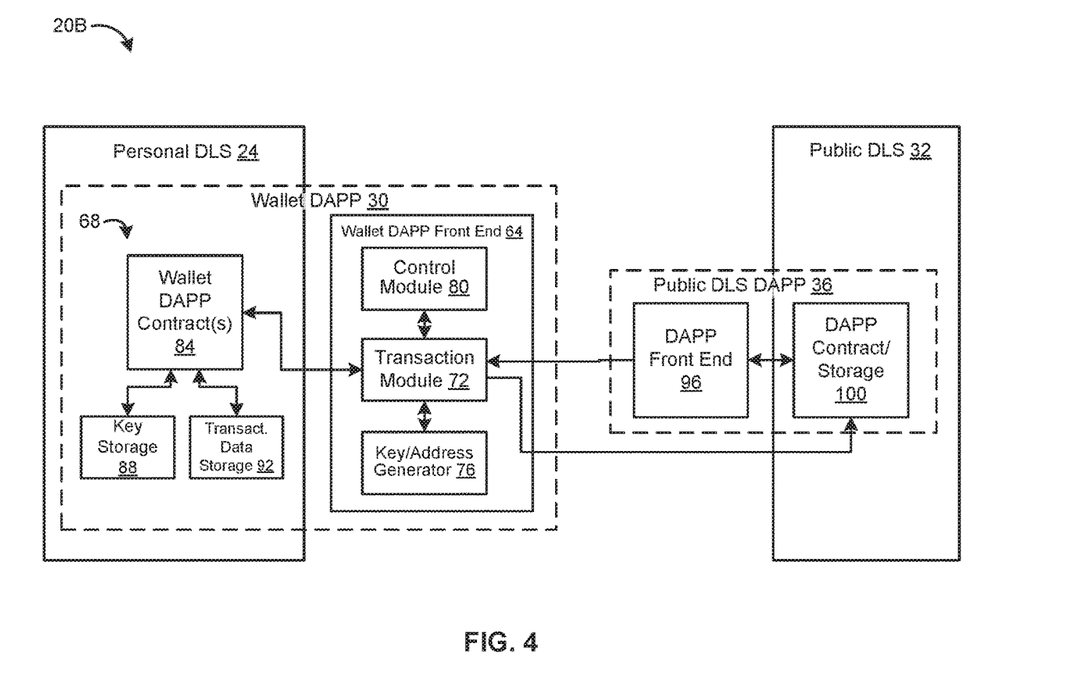
FIG. 4 is a schematic diagram depicting another embodiment of a system for providing a personal distributed ledger.

FIG. 4 depicts an embodiment 20B of the system of FIG. 1 showing embodiments of the personal DLS DAPP 28 and a public DLS DAPP 36 in greater detail. In the depicted embodiment, the personal DLS DAPP 28 is a wallet DAPP 30. The wallet DAPP 30 is configured to provide wallet functions for conducting transactions in the public DLSs 32 and recording functions for recording the conducted transactions in the personal DLS 24.

The wallet DAPP 30 includes a front end component 64 and a DLS component 68. The front end component 64 includes one or more program modules to provide functions of the wallet DAPP. The program modules may include a transaction module 72, an address and key generator module 76, and a control module 80. The transaction module 72 is configured to receive a request to sign a transaction from a public DLS DAPP 36, invoke the address and key generator module 76 to generate an address and/or public-private key pair for the transaction, sign the transaction using the generated address and private key, and transmit the transaction to at least one distributed node of the public DLS 32. The transaction module 72 is also configured to generate a transaction to the personal DLS 24 containing information related to the transaction conducted in the public DLS 32, and transmit the transaction to at least one distributed node of the personal DLS 24. The address and key generator module 76 is configured to generate new addresses in a public DLS address space and new public-private key pairs in response to a request from the transaction module 72, and provide the generated address and key pairs to the transaction module 72. The control module 80 is configured to control operation of the modules of the wallet DAPP 30 to provide the functions discussed herein.

The DLS component 68 of the wallet DAPP 30 includes one or more smart contracts 84 stored in the distributed ledger of the personal DLS 24 and one or more associated data storage structures 88, 92. The wallet DAPP contract 84 includes one or more program functions to be invoked by a transaction or call to the contract 84 to perform the functions of the wallet DAPP contract 84. The program functions may include a transaction information storage function and a transaction information read function. The transaction information storage function is invoked by a transaction to the contract 84, and is configured to receive as an input information related to a transaction conducted in the public DLS 32, such as a private key used to sign the transaction and an identification of the transaction, and in response store the transaction information in corresponding data structure(s) in the personal DLS, such as a key storage data structure 88 and a transaction identifier storage data structure 92. The transaction information read function is invoked by a call to the contract 84, and configured to output the stored transaction information in response to an authorized request. The associated data structures include data structures to store the transaction information stored by the wallet DAPP contract 84, including a key storage data structure 88 to store the keys such as the private keys, or public-private key pair, used to sign the transaction, and a transaction identifier storage data structure 92 to store the transaction information identifying the transaction.

The public DLS DAPP 36 also includes a front end component 96 and a DLS component 100. The front end component 96 includes one or more program modules to provide functions of the DAPP. The DLS component 100 includes one or more smart contracts and one or more associated data storage structures stored in the distributed ledger of the public DLS. The DAPP contract includes one or more program functions to be invoked by a transaction to the contract to perform the functions of the DAPP contract.

In embodiments, the wallet DAPP 30 may include only any subset of, or an alternative connection of, the features depicted in or discussed herein in regard to FIG. 4.

Figure 5:
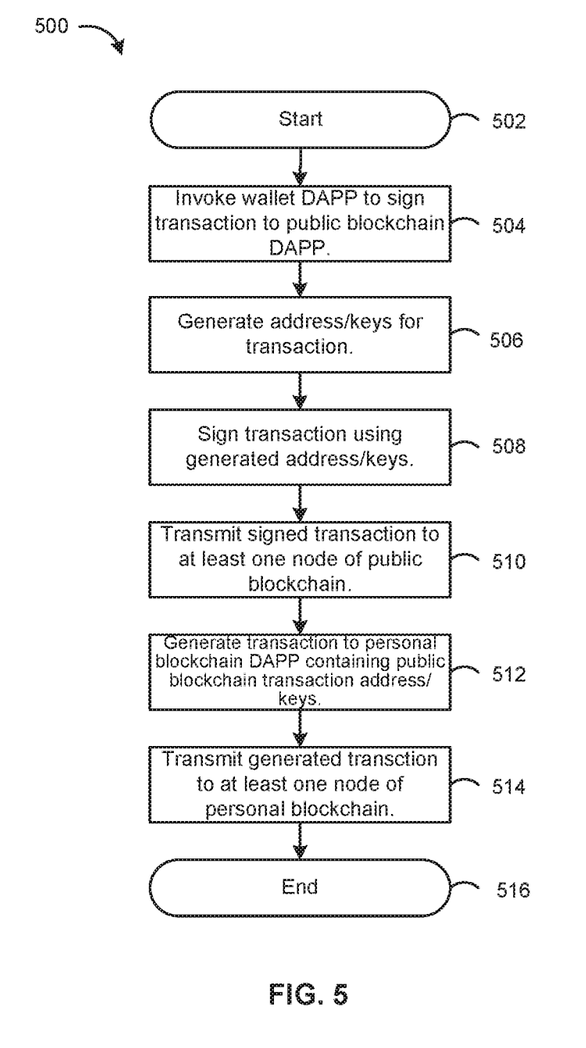
FIG. 5 is a flowchart depicting an embodiment of a method of using a personal distributed ledger system to record details of transactions conducted in a public distributed ledger system.

FIG. 5 depicts an embodiment of a method 500 of using the personal DLS 24 to record transactions conducted in one or more of the public DLSs 32. The method begins at step 502. A first portion of the method conducts a transaction with the public DLS DAPP 32.

At step 504, the wallet DAPP front end 64 is invoked by the public DLS DAPP front end 96 to sign a transaction that the user wishes to conduct with the public DLS DAPP 36. In invoking the wallet DAPP front end 64, the public DAPP front end 96 may pass the unsigned transaction to the transaction module 72 of the wallet DAPP front end 64. At step 506, the address and key generator module 76 of the wallet DAPP front end 64 generates a new address in the address space of the public DLS 32 and a public-private key pair for signing the transaction. At step 508, the transaction module 72 of the wallet DAPP front end 64 signs the transaction using the generated address and private key. At step 510, the transaction module 72 transmits the signed transaction, addressed to the DAPP contract, to at least one distributed node of the public DLS 32. As part of the ledger structure creation process in the public DLS 32, in due course the transaction will be incorporated into a new ledger structure and thus executed by the DAPP contract.

A second portion of the method then records the transaction conducted in with the public DLS DAPP 36 in the personal DLS 24.

At step 512, the transaction module 72 of the wallet DAPP front end 64 generates a transaction to the wallet DAPP contract 84 containing information related to the conducted transaction and configured to invoke the transaction information storage function of the wallet DAPP contract 84. The information related to the transaction may include information that may be used to link the user conducting the transaction to the transaction. In embodiments, the transaction information includes the private key used to sign the transaction. In embodiments, the transaction additionally or alternatively includes an identifier identifying the transaction. The identifier may include one or more of: an execution receipt generated by execution of the transaction, or a portion of the transaction.

At step 514, the transaction module 72 transmits the transaction containing the public DLS transaction information to at least one distributed node of the personal DLS 24. As part of the ledger structure creation process of the personal DLS 24, the transaction will be incorporated into a new ledger structure and executed by the wallet DAPP contract 84. Executing the transaction by the wallet DAPP contract 84 invokes the transaction information storage function, which stores the transaction information contained in the transaction in the corresponding data structures. For example, for transaction information including the private key and transaction identifier, the transaction information storage function stores the private key in the key storage data structure 88 and the transaction identifier in the transaction identifier storage data structure 92. The method ends at step 516.

In embodiments, a method of using a personal DLS 24 to record transactions conducted in one or more public DLSs 32 may include only any subset of, or an alternative ordering of, the features depicted in or discussed above in regard to FIG. 5.

In embodiments, other embodiments of conducting a transaction with the public DLS DAPP 36 using a wallet DAPP 30 may be paired with the second portion of the method 500 of FIG. 5 of recording the transaction conducted in with the public DLS DAPP 36 in the private DLS 24.

The personal DLS 24 may be configured to have a selected number of distributed nodes. While public DLSs 32 typically include a large number of distributed nodes in order to provide an immutable, secure and reliable system without necessitating a trusted authority, in contrast, in embodiments the personal DLS 24 may include a relatively small number of distributed nodes, while still providing an immutable, secure and reliable system, due to a degree of trust that may be naturally present in the distribution of the system. In embodiments, the personal DLS 24 may include a single node. In other embodiments, the personal DLS 24 may include at least two nodes.

The personal DLS 24 also may be configured to have at least one node and at least a portion of the personal DLS DAPP(s) 28 hosted and operated for the user by a host system provider. The node hosted by the host system provider may be a master node of the personal DLS 24 that controls whether other nodes are granted permission to enter the personal DLS. The personal DLS DAPP(s) 28 are configured to provide only user designated systems, such as the host system and/or a user system, with access to control features of the DLS DAPP(s) 28 and secure information, such as the private keys. It may be advantageous to the user for such a provider to host at least a portion of the personal DLS 24 in order to free the user from performing such operations.

The personal DLS 24 also may be configured to have at least one node and at least a portion of the personal DLS DAPP(s) 28 hosted and operated by a validator system. The node hosted by the validator system may increase the immutability, security and reliability of the personal DLS, and provides a way to selectively share the contents of the personal DLS 24, such as the record of public DLS transactions stored in the personal DLS 24, with an entity outside the user or host system, such as to satisfy know-your-customer mandates.

Figure 6:
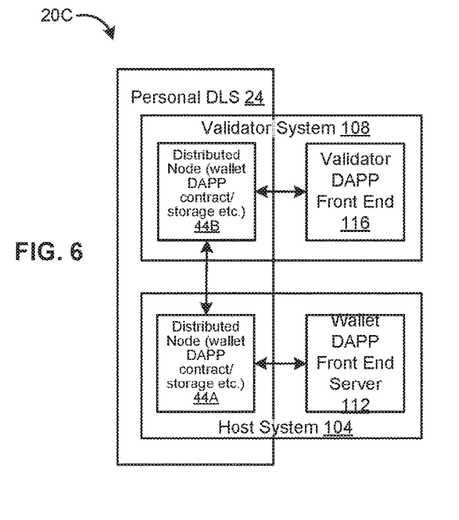
FIG. 6 is a schematic diagram depicting another embodiment of a system for providing a personal distributed ledger.

FIG. 6 depicts an embodiment 20C of the system for providing the personal DLS 24, the personal DLS 24 including two distributed nodes, including a first, master node 44A hosted by a host system 104 and a second, validator node 44B hosted by a validator system 108. The host system 104 provides one or more computing devices to host the master node 44A of the personal DLS 24 and at least a portion of the wallet DAPP front end 64, such as a wallet DAPP front end server 112 to serve the front end 64. The validator system 108 provides one or more computing devices to host the validator node 44B of the personal DLS 24 and at least a portion of a validator DAPP front end 116. The validator DAPP front end 116 is a front end to the wallet DAPP contract 84 for providing the selective access to the personal DLS 24 for the validator system 108.

Figure 7:
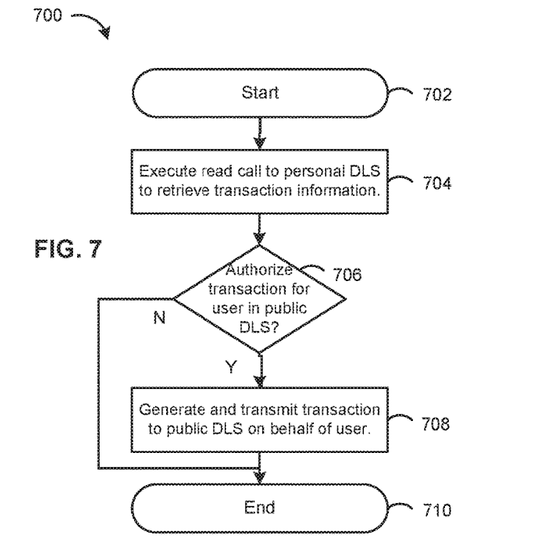
FIG. 7 is a flowchart depicting an embodiment of a method of using a personal distributed ledger system to confirm a record of transactions conducted in a public distributed ledger system.

FIG. 7 depicts an embodiment of a method 700 of using the personal DLS 24 to confirm to a validator system 108 the record of public DLS transactions stored in the personal DLS 24. The method begins at step 702. At step 704, the validator DAPP front end 116 executes a read call to the wallet DAPP contract 84 to invoke the transaction information read function to read at least a portion of the transaction information stored in the personal DLS 24. The read call may be configured provide a variety of different outputs to the validator DAPP front end 116. For example, the read call may provide a list of transaction identifiers associated with the user. In another example, the read call may accept as an input an indication of the selected portion of the record to be read, such as one or more transaction identifiers, and provide as an output a confirmation that the transactions are stored with corresponding private keys in the personal DLS.

At step 706, the validator system 108 determines whether to authorize the user to conduct transactions utilizing the validator system 108 or another system controlled or authorized by the validator system 108 based on the outcome of the executed read call. In one example, the validator system 108 may be part of a financial institution system having DAPP components to conduct transactions in one or more public DLSs, and the financial institution system may decide based on the outcome of the read call whether to authorize the user to utilize the DAPP components to conduct transactions in the public DLSs. For instance, the financial institution system may enable trading in a public DLS by users using tokens that the financial institution system mints on behalf of the users, and may determine whether to enable such minting on behalf of a user based on a review the transaction record in the personal DLS 24, such as based on a review of whether the transaction record includes any fraudulent or otherwise suspicious or undesirable transactions.

If at step 706, it is determined to authorize the user to conduct transactions using the validator 108 or another system, the method proceeds to step 708. At step 708, the validator system 108 or another system controlled or authorized by the validator system conducts a transaction on behalf of the user in the public DLS 32. The transaction may include one or more of: minting tokens in the public DLS 32 on behalf of the user, conducting a financial transaction in the public DLS 32 on behalf of the user, etc. By contrast, if at step 706, it is determined to deny authorization to the user to conduct transactions using the validator 108 or another system controlled or authorized by the validator system 108, the method proceeds to step 710. The method ends at step 710.

In embodiments, a method of using a personal DLS 24 to confirm to a validator system 108 the record of public DLS transactions stored in the personal DLS 24 may include only any subset of, or an alternative ordering of, the features depicted in or discussed above in regard to FIG. 7.

Figure 8:
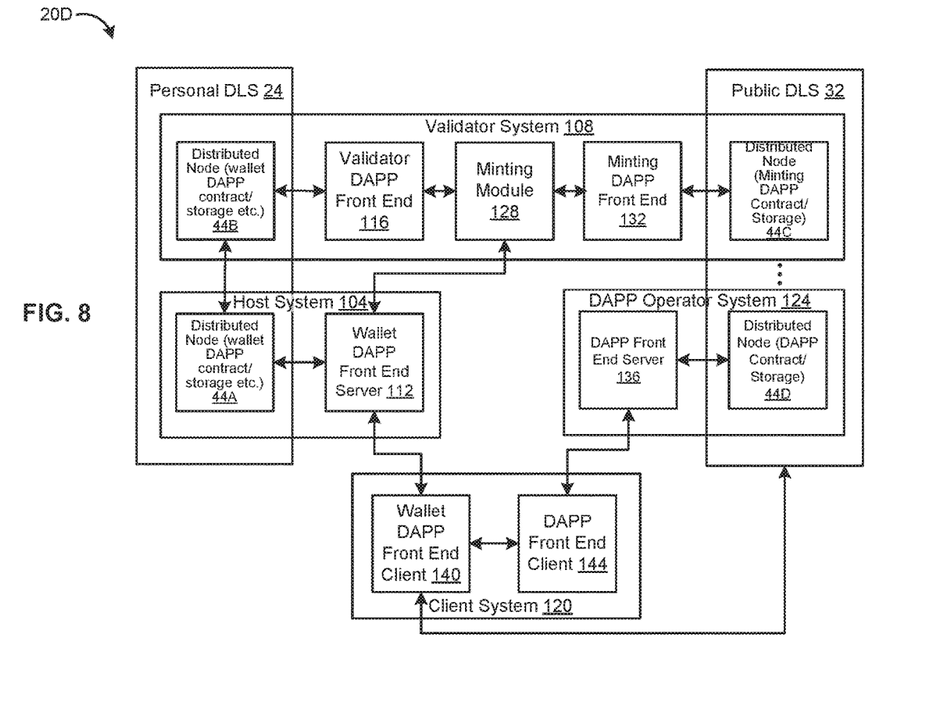
FIG. 8 is a schematic diagram depicting another embodiment of a system for providing a personal distributed ledger.

FIG. 8 depicts an embodiment 20D of a specific implementation of the system for providing a personal DLS 24 depicted in FIG. 7, including a personal DLS 24, host system 104, validator system 108, client system 120, DAPP operator system 124, and public DLS 32. The host system 104 hosts a master node 44A of the personal DLS 24 and a front end server 112 of the wallet DAPP 30. The host system 104 may be provided on behalf of the user by a service provider. The validator system 108 runs a validator node 44B of the personal DLS 24, the validator DAPP front end 116, a minting module 128, a minting DAPP front end 132, and a node of the public DLS 44C. The validator system 108 may be provided by a financial institution, such as a bank, investment bank, trading institution, etc. The DAPP operator system 124 runs a front end server 136 for a DAPP 36 based in the public DLS 32, and a node 44D of the public DLS. The DAPP operator system 124 may be provided by the operator of the DAPP 36. The client system 120 runs a front end client 140 of the wallet DAPP 30 and a front end client 144 of a public DLS DAPP 36. The client system 120 may be a system of the user.

In the embodiment of FIG. 8, the host and validator systems 104, 108 operate as discussed above in regard to FIGS. 6 and 7 to use the personal DLS 24 to confirm the record of public DLS transactions stored in the personal DLS 24. The validator system 108 determines whether to authorize, based on review of the transaction record in the personal DLS 24, the minting module 128 to respond to requests by the user, via the wallet DAPP 30, to utilize the minting DAPP 132 to mint tokens for the user in the public DLS 32 in exchange for user funds. Upon authorization, the user engages in transactions with the DAPP 36 in the public DLS 32, via the DAPP front end 136, using the minted tokens now attached to a user account in the public DLS 32.

In embodiments, the system for providing a personal distributed ledger may include only any subset of, or an alternative connection of, the features depicted in or discussed herein in regard to FIG. 8.

Figure 9:
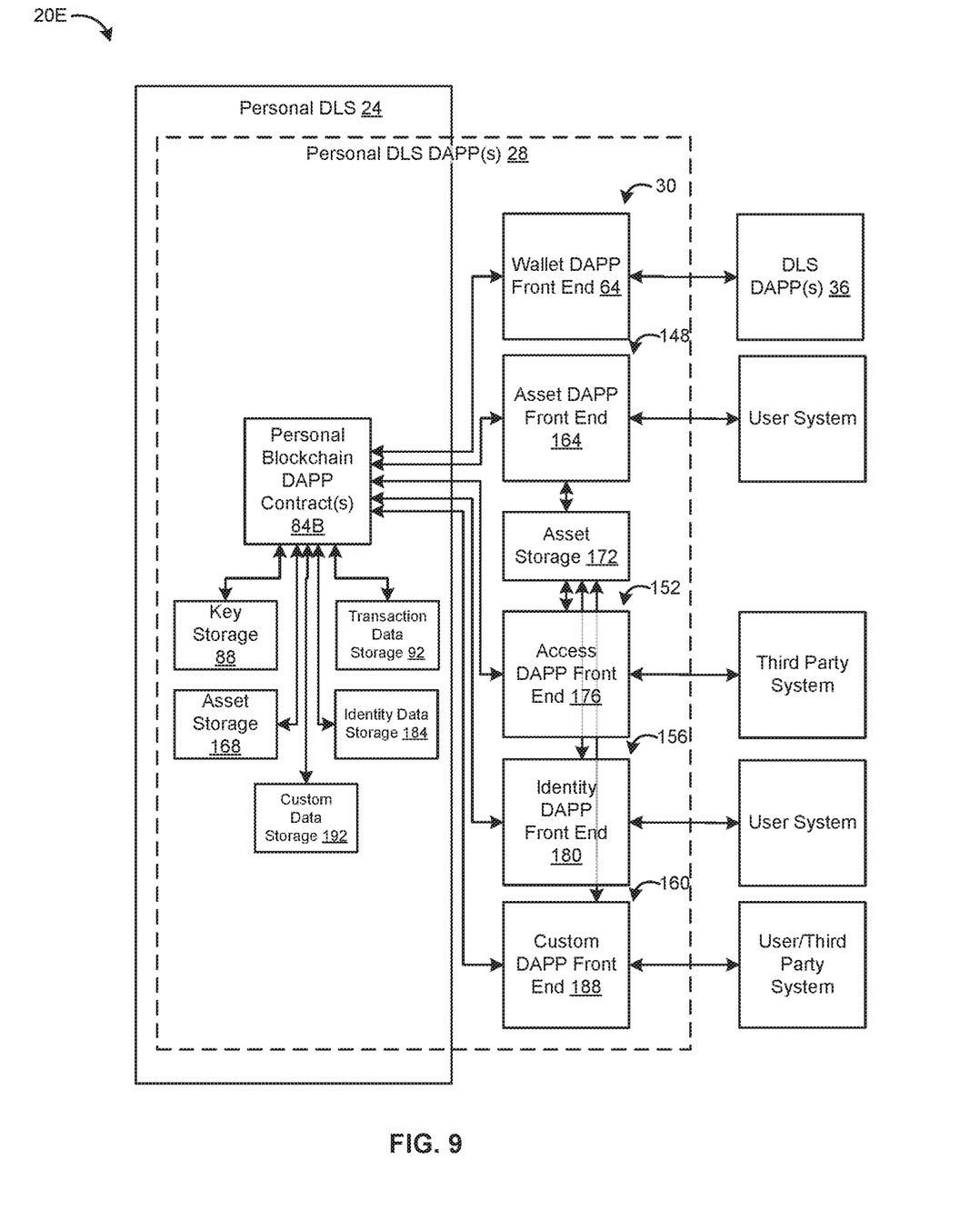
FIG. 9 is a schematic diagram depicting another embodiment of a system for providing a personal distributed ledger.

The personal DLS 24 also may be utilized to provide personal data archiving and associated functionalities for the user. FIG. 9 depicts an embodiment 20E of an expansion of the system to also provide immutable, secure and reliable personal data archiving and retrieval functions. In the depicted embodiment, the system includes the personal DLS 24, one or more personal DLS DAPPs 28, and one or components interfacing with the personal DLS DAPPS 28. For purposes of clarity of illustration, public DLSs 32 are omitted from FIG. 8, although the one or components interfacing with the personal DLS DAPPS 28 may be based in such public DLSs 32.

The personal DLS DAPPs 28 include one or more of the wallet DAPP 30, an asset DAPP 148, an access DAPP 152, and identity DAPP 150 and a custom DAPP 160. Each of the DAPPs 28 is configured to provide associated functions for personal data archiving and retrieval, and includes a front end component and a DLS component. The wallet DAPP 30 has already been discussed above.

The asset and access DAPPs 148, 152 may provide an immutable, secure and reliable way to store, and ultimately distribute, digital assets of the user. The asset DAPP 148 is configured to receive and process digital assets, such as images, audio, video, and other data types, and store the assets or a representation of the assets in the personal DLS 24. The asset DAPP 148 includes an asset DAPP front end 164, the personal DLS DAPP contract 84B, an asset storage data structure 168 and an asset storage 172. The asset DAPP front end 164 is configured to provide a user interface for the user to load digital assets to the asset DAPP 148 from a user system 120. The personal DLS DAPP contract 84B is the smart contract stored in the personal DLS 24, and is configured to be invoked by a transaction containing the uploaded assets or representation and store the contained assets or representation in a corresponding asset storage data structure 168 in the personal DLS 24. The asset storage data structure 168 is a data structure in the personal DLS 24 associated with the personal DLS DAPP contract 84B to store the asset or representation stored by the personal DLS DAPP contract 84B. The asset storage 172 is a secure storage outside of the personal DLS 24 to store the uploaded asset when the asset is too large to itself be stored in the personal DLS 24.

Note that, in embodiments, each of the personal DAPPs 28 may include their own distinct front end and DLS components. In other embodiments, at least some of the personal DAPPS 28, or even all of the personal DAPPs 28, may share either or both of front end and DLS components. For example, a plurality of different ones of the personal DAPPs 28 may each have their own distinct DAPP front end, which may enable the front end to be adapted to the specific user interaction that that DAPP entails, such as specific types of data collection. In another example, a plurality of different ones of the personal DAPPs may share a common personal DAPP contract 84B, which implements the personal DAPP contract functions for each of those personal DAPPs.

Figure 10:
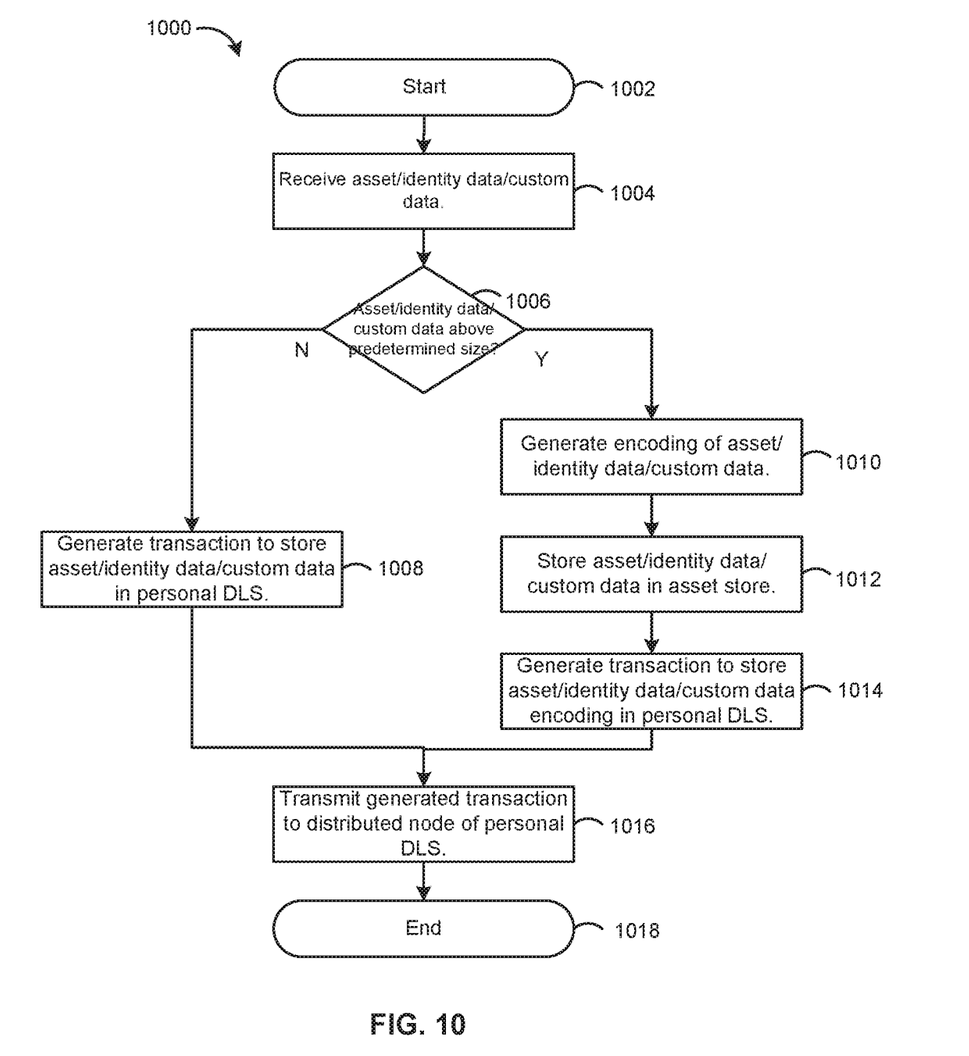
FIG. 10 is a flowchart depicting an embodiment of a method of using a personal distributed ledger system to store digital assets, identity data and/or custom data.

FIG. 10 depicts an embodiment of a method 1000 of using the personal DLS 24 to store digital assets. The method begins at step 1002. At step 1004, the digital asset is received by the asset DAPP front end 164 from the user via the user system 120. At step 1006, it is determined whether the digital asset has a storage size above a predetermined storage size. For digital assets below the predetermined size, the method stores the digital asset itself in the personal DLS 24, whereas for digital assets above the predetermined size, the method stores a representation of the digital asset in the personal DLS 24 and stores the asset itself in the secure storage 172. Thus, if at step 1006 it is determined that the digital asset size is below the predetermined storage size, the method proceeds to step 1008. At step 1008, the asset DAPP front end 164 generates a transaction to the personal DLS DAPP contract 84B, containing the digital asset, to store the digital asset in the asset storage data structure 168. At step 1016, the asset DAPP front end 164 transmits the transaction to at least one distributed node of the personal DLS 24. As part of the ledger structure creation process in the personal DLS 24, the transaction will be incorporated into a new ledger structure and executed by the personal DLS DAPP contract 84B. Executing the transaction by the personal DLS DAPP contract 84B invokes an asset storage function of the personal DLS DAPP contract 84B, which stores the asset contained in the transaction in the asset storage data structure 168.

By contrast, if at step 1006 it is determined that the digital asset size is above the predetermined storage size, the method proceeds to step 1010. At step 1010, the asset DAPP front end 164 generates a representation of the asset have a reduced size in comparison to the asset. In embodiments, generating the representation includes performing at least one cryptographic hash function on the asset, with the representation of the asset being the output of at least one cryptographic hash function. At step 1012, the asset DAPP front end 164 then stores the digital asset in the secure asset storage 172 outside of the personal DLS 24. At step 1014, the asset DAPP front end 164 generates a transaction to the personal DLS DAPP contract 84B, containing the representation of the digital asset, to store the representation of the digital asset in the asset storage data structure 168. At step 1016, the asset DAPP front end 164 transmits the transaction to at least one distributed node of the personal DLS 24. As part of the ledger structure creation process in the personal DLS 24, the transaction will be incorporated into a new ledger structure and executed by the personal DLS DAPP contract 84B, and executing the transaction by the personal DLS DAPP contract 84B invokes the asset storage function of the personal DLS DAPP contract 84B, which stores the representation contained in the transaction in the asset storage data structure 168. The method ends at step 1018.

In embodiments, a method of using a personal DLS 24 to store digital assets may include only any subset of, or an alternative ordering of, the features depicted in or discussed above in regard to FIG. 10.

The user may distribute the digital assets stored using the personal DLS 24 to authorized entities, such as an entity entering into a license agreement for the digital asset. The access DAPP 152 is configured to enable selective access to digital assets stored using the personal DLS 24. The access DAPP 152 includes an access DAPP front end 176, the personal DLS DAPP contract 84B, the asset data structure 168 and the asset storage 172. The access DAPP front end 176 is configured to provide a user interface to the entity to license, request and/or receive the digital assets. The personal DLS DAPP contract 84B is the smart contract stored in the personal DLS 24, and is configured to be invoked by a read call to selectively retrieve the assets or asset representations stored in the corresponding asset storage data structure 168 in the personal DLS 24.

Figure 11:
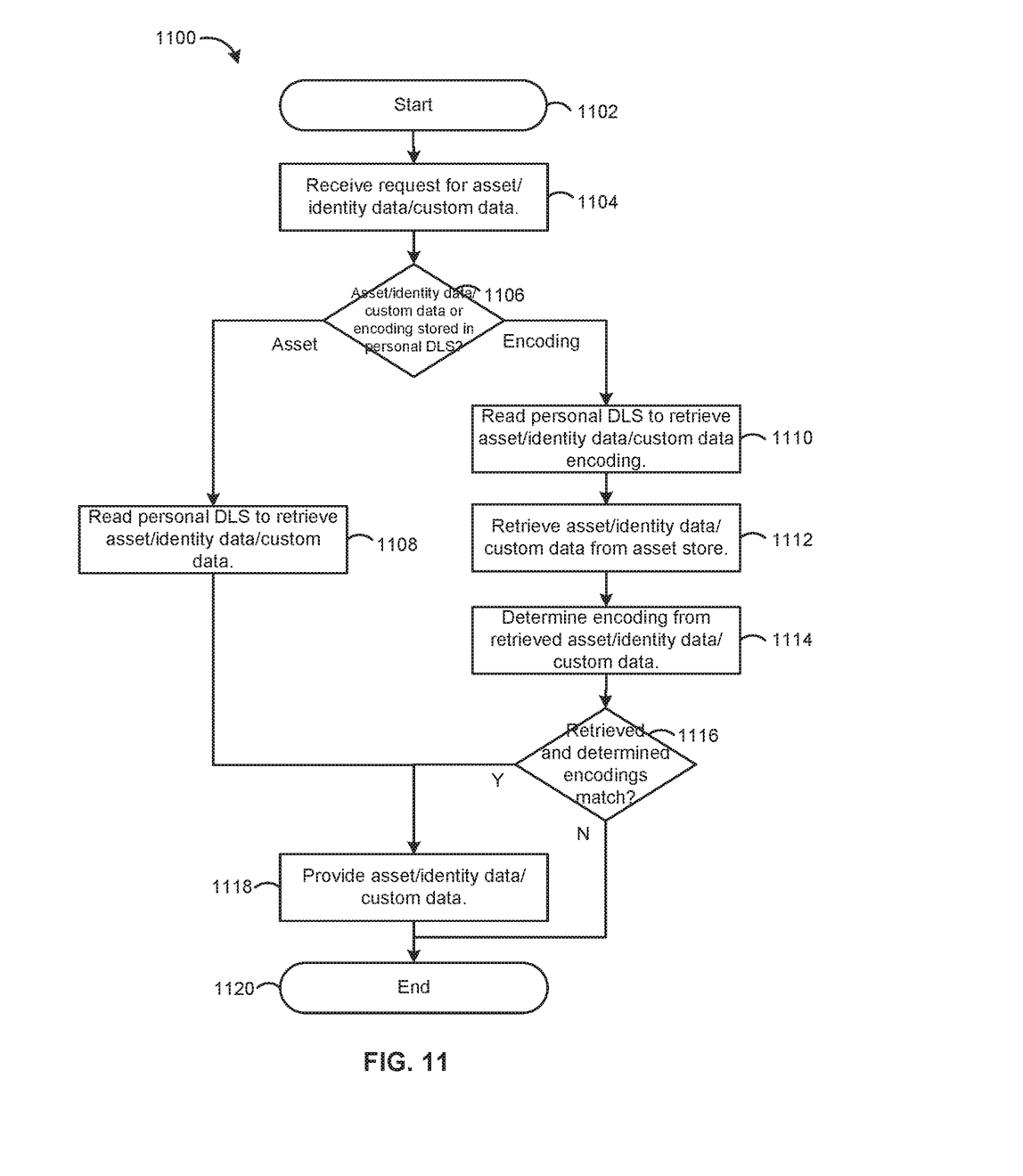
FIG. 11 is a flowchart depicting an embodiment of a method of using a personal distributed ledger system to distribute digital assets, identity data and/or custom data.

FIG. 11 depicts a method of distributing a digital asset stored using the personal DLS 24 to an authorized entity. The method begins at step 1102. At step 1104, the access DAPP front end 176 receives a request for a digital asset from an authorized requestor. At step 1106, the access DAPP front end 176 determines if the asset itself or a representation of the asset is stored in the personal DLS 24. For example, the access DAPP 152 may consult a log of assets stored using the personal DLS 24 to make the determination. If at step 1106 it is determined that the requested asset itself is stored in the personal DLS 24, the method proceeds to step 1108. At step 1108, the access DAPP front end 176 performs a read call to the personal DLS DAPP contract 84B to invoke an asset read function of the contract, which reads an indicated asset from the asset storage data structure 168 and outputs the retrieved asset. At step 1118, the retrieved asset is provided to the requesting authorized entity via the access DAPP front end 176. As part of the providing, the access DAPP front end 176 may optionally encrypt the retrieved asset, such as by using a public key of the requesting entity.

By contrast, if at step 1106 it is determined that the representation of the requested asset is stored in the personal DLS 24, and the asset itself is stored in the secure asset store 172, the method proceeds to step 1110. At step 1110, the access DAPP front end 176 performs a read call to the personal DLS DAPP contract 84B to invoke the asset read function of the contract, which reads an indicated asset representation from the asset storage data structure 168 and outputs the retrieved asset representation. At step 1112, the access DAPP front end 176 retrieves the asset itself from the secure asset store 172. At step 1114, the asset DAPP front end 176 generates a representation of the asset from the retrieved asset. In embodiments, generating the representation includes performing at least one cryptographic hash function on the asset, with the representation of the asset being the output of at least one cryptographic hash function. At step 1116, it is determined whether the representation retrieved from the personal DLS 24 matches the representation determined at step 1114, such as by comparing the representations. The determination may be performed in order to ensure that the asset retrieved from the secure asset store 172 has not changed, as will generally be discernable by comparison to the representation stored in the personal DLS 24, which has a relatively higher degree of immutability, security and reliability. If at step 1116, it is determined that the representations match, the method proceeds to step 1118, where the asset is provided to the requesting authorized entity, as discussed above. If at step 1116, it is determined that the representations do not match, the asset retrieved from the asset store 172 is not provided to the requesting entity, as the asset in the secure asset store 172 may have become corrupted, and the method instead proceeds to step 1120. At step 1120, the method ends.

In embodiments, a method of using a personal DLS 24 to distribute digital assets may include only any subset of, or an alternative ordering of, the features depicted in or discussed above in regard to FIG. 11.

The personal DLS 24 also may provide an immutable, secure and reliable way to store, and ultimately distributed, identity data of the user. The identity DAPP 156 is configured to receive and process identity data, such as identities (e.g., passports, driver's licenses, etc.), personal identifiers (social security numbers, etc.), biometric information (fingerprints, iris scans, facial patterns, DNA patterns, etc.), etc., and store the identity data or an encoding of the identity data in the personal DLS. The identity DAPP 156 includes an identity DAPP front end 180, the personal DLS DAPP contract 84B, an identity data storage data structure 184 and the asset storage 172. The identity DAPP front end 180 is configured to provide a user interface for the user to load identity data from a user system 120. The personal DLS DAPP contract 84B is the smart contract stored in the personal DLS 24, and is configured to be invoked by a transaction containing the uploaded identity data or representation of the identity data and store the contained identity data or representation in a corresponding identity data storage data structure 184 in the personal DLS 24. The identity data storage data structure 184 is a data structure in the personal DLS 24 associated with the personal DLS DAPP contract 84B to store the identity data or representation stored by the personal DLS DAPP contract 84B. The asset storage 172 is the secure storage outside of the personal DLS 24 to store the uploaded identity when the identity data is too large to itself be stored in the personal DLS 24.

The identity data may be stored in the personal DLS 24 using the identity data according to the method of FIG. 10, adapted to receive, process and store the identity data instead of digital assets. Likewise, the identity data may be distributed to authorized requesting entities using the access DAPP and method of FIG. 11, adapted to retrieve and distributed the identity data instead of digital assets.

The personal DLS also may provide an immutable, secure and reliable way to store, and ultimately distributed, custom data related to third parties. The custom DAPP 160 may be configured by the user in conjunction with third parties to provide a variety of different data storage and distribution scenarios. The custom DAPP includes a custom DAPP front end 188, the personal DLS DAPP contract 84B, a custom data storage data structure 192 and the asset store 172. The custom DAPP 160 may be configured to function, such as by itself or in conjunction with the access DAPP 152, much like the asset, identity and access DAPPs and the methods of FIGS. 10 and 11, to receive, process and store custom data in the personal DLS 24, and ultimately distribute the custom data to the third parties or other entities, as agreed between the user and the third party.

In embodiments, the system for providing a personal distributed ledger may include only any subset of, or an alternative connection of, the features depicted in or discussed herein in regard to FIG. 9.

Components of the embodiments of the system for providing a personal distributed ledger, such as nodes of the personal DLS, components of the personal DLS DAPPs, nodes of the public DLS, components of the public DLS DAPPs, the validator system, etc., and/or any individual one, subset, or all of the components thereof, may be implemented as hardware, software, or a mixture of hardware and software. For example, each of the nodes of the personal DLS, components of the personal DLS DAPPs, nodes of the public DLS, components of the public DLS DAPPs, the validator system, etc., and/or any individual one, subset, or all of the components thereof, may be implemented using a processor and a non-transitory storage medium, where the non-transitory machine-readable storage medium includes program instructions that when executed by the processor perform embodiments of the functions of such components discussed herein.

In embodiments, each of the nodes of the personal DLS, components of the personal DLS DAPPs, nodes of the public DLS, components of the public DLS DAPPs, the validator system, etc., and/or any individual one, subset, or all of the components thereof, may be implemented using a computer system, such as, e.g., a desktop computer, laptop computer, mobile computing device, network device, server, Internet server, cloud server, etc.

Additional embodiments of the personal DLS, personal DLS DAPP(s), public DLS, public DLS DAPP(s) and associated methods 500, 700, 1000, 1100 discussed herein are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of conducting transactions, the method comprising:
   generating, by a wallet distributed application for a user, an address for use with a public distributed ledger system and a private key;
   generating, by the wallet distributed application, a first transaction to a distributed application in the public distributed ledger system, the generating using the generated address and private key;
   transmitting the first transaction to the public distributed ledger system for execution;
   upon execution of the first transaction, generating, by the wallet distributed application, a second transaction to a smart contract of a personal distributed ledger system, the generated second transaction containing information identifying the executed first transaction, the identifying information including at least a portion of the executed first transaction and the private key used to sign the first transaction, the personal distributed ledger system being separate from the public distributed ledger system and including only distributed nodes authorized by the user, the authorized distributed nodes including a validator node hosted by a financial institution system;
   transmitting, by the wallet distributed application, the second transaction to at least one distributed node of the personal distributed ledger system;
   retrieving, by the validator node hosted by the financial institution system, at least a portion of the identifying information from the personal distributed ledger system by executing a read call to the smart contract of the personal distributed ledger system;
   determining, by the financial institution system, whether to authorize the user associated with the personal distributed ledger system to further conduct transactions in the public distributed ledger system using tokens of the public distributed ledger system minted by the financial institution system, the determining based on the retrieved identifying information; and
   in response to determining to authorize the user, minting, by the financial institution system based on the retrieved identifying information, the tokens of the public distributed ledger system for use by the user to conduct further transactions in the public distributed ledger system.

2. The method of claim 1, wherein the information identifying the executed first transaction includes an execution receipt for the first transaction.

3. The method of claim 1, further comprising:
   receiving, by the wallet distributed application, an invocation to sign the first transaction, the invocation including the first transaction, the invocation received from the distributed application of the public distributed ledger system.

4. The method of claim 1, further comprising:
   generating a third transaction utilizing the minted tokens.

5. At least one non-transitory machine-readable storage medium having program instructions, which when executed by processors cause a method of conducting transactions to be performed, the method comprising:

generating, by a wallet distributed application for a user, an address for use with a public distributed ledger system and a private key;

generating, by the wallet distributed application, a first transaction to a distributed application in the public distributed ledger system, the generating using the generated address and private key;

transmitting the first transaction to the public distributed ledger system for execution;

upon execution of the first transaction, generating, by the wallet distributed application, a second transaction to a smart contract of a personal distributed ledger system, the generated second transaction containing information identifying the executed first transaction, the identifying information including at least a portion of the executed first transaction and the private key used to sign the first transaction, the personal distributed ledger system being separate from the public distributed ledger system and including only distributed nodes authorized by the user, the authorized distributed nodes including a validator node hosted by a financial institution system;

transmitting, by the wallet distributed application, the second transaction to at least one distributed node of the personal distributed ledger system;

retrieving, by the validator node hosted by the financial institution system, at least a portion of the identifying information from the personal distributed ledger system by executing a read call to the smart contract of the personal distributed ledger system;

determining, by the financial institution system, whether to authorize the user associated with the personal distributed ledger system to further conduct transactions in the public distributed ledger system using tokens of the public distributed ledger system minted by the financial institution system, the determining based on the retrieved identifying information; and in response to determining to authorize the user, minting, by the financial institution system based on the retrieved identifying information, the tokens of the public distributed ledger system for use by the user to conduct further transactions in the public distributed ledger system.

6. The at least one non-transitory machine-readable storage medium of claim 5, the method further comprising:
generating a third transaction utilizing the minted tokens.

7. The at least one non-transitory machine-readable storage medium of claim 5, wherein the information identifying the executed first transaction includes an execution receipt for the first transaction.

8. The at least one non-transitory machine-readable storage medium of claim 5, the method further comprising:
receiving, by the wallet distributed application, an invocation to sign the first transaction, the invocation including the first transaction, the invocation received from the distributed application of the public distributed ledger system.

9. A system for conducting transactions, the system comprising:

a host computing system including at least one processor configured to execute program instructions to cause the following to be performed:
generating, by a wallet distributed application for a user, an address for use with a public distributed ledger system and a private key;

generating, by the wallet distributed application, a first transaction to a distributed application in the public distributed ledger system, the generating using the generated address- and private key;

transmitting the first transaction to the public distributed ledger system for execution;

upon execution of the first transaction, generating, by the wallet distributed application, a second transaction to a smart contract of a personal distributed ledger system, the generated second transaction containing information identifying the executed first transaction, the identifying information including at least a portion of the executed first transaction and the private key used to sign the first transaction, the personal distributed ledger system being separate from the public distributed ledger system and including only distributed nodes authorized by the user, the authorized distributed nodes including a validator node hosted by a financial institution system;

transmitting, by the wallet distributed application, the second transaction to at least one distributed node of the personal distributed ledger system; and a validator computing system including at least one processor configured to execute program instructions to cause the following to be performed:
retrieving, by the validator node hosted by the financial institution system, at least a portion of the identifying information from the personal distributed ledger system by executing a read call to the smart contract of the personal distributed ledger system;

determining, by the financial institution system, whether to authorize the user associated with the personal distributed ledger system to further conduct transactions in the public distributed ledger system using tokens of the public distributed ledger system minted by the financial institution system, the determining based on the retrieved identifying information; and in response to determining to authorize the user, minting, by the financial institution system based on the retrieved identifying information, the tokens of the public distributed ledger system for use by the user to conduct further transactions in the public distributed ledger system.

10. The system of claim 9, wherein the information identifying the executed first transaction includes an execution receipt for the first transaction.

11. The system of claim 9, wherein the host system is further configured to cause the following to be performed:
receiving, by the wallet distributed application, an invocation to sign the first transaction, the invocation including the first transaction, the invocation received from the distributed application of the public distributed ledger system.

* * * * *